United States Patent Office 3,071,035
Patented Jan. 1, 1963

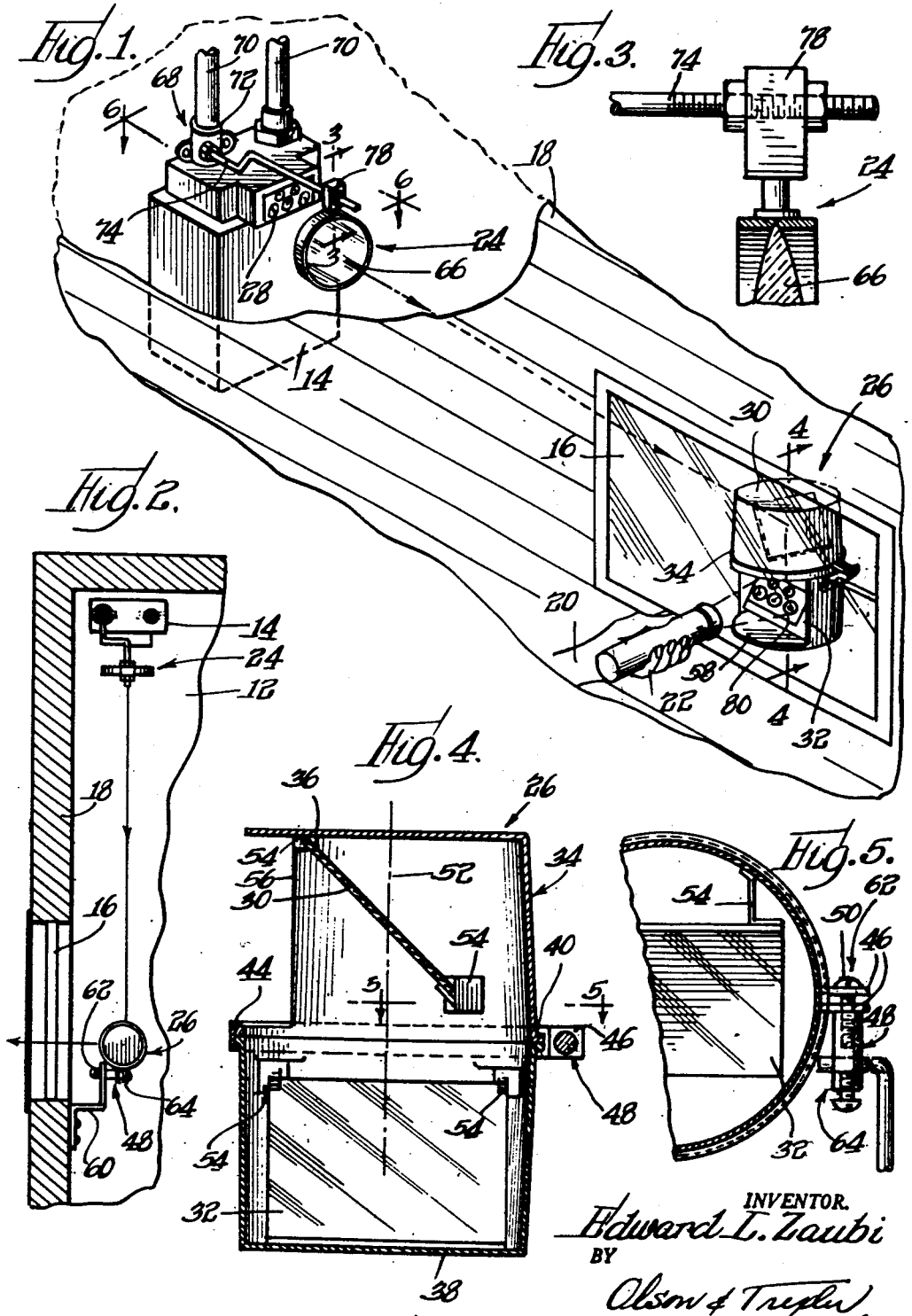

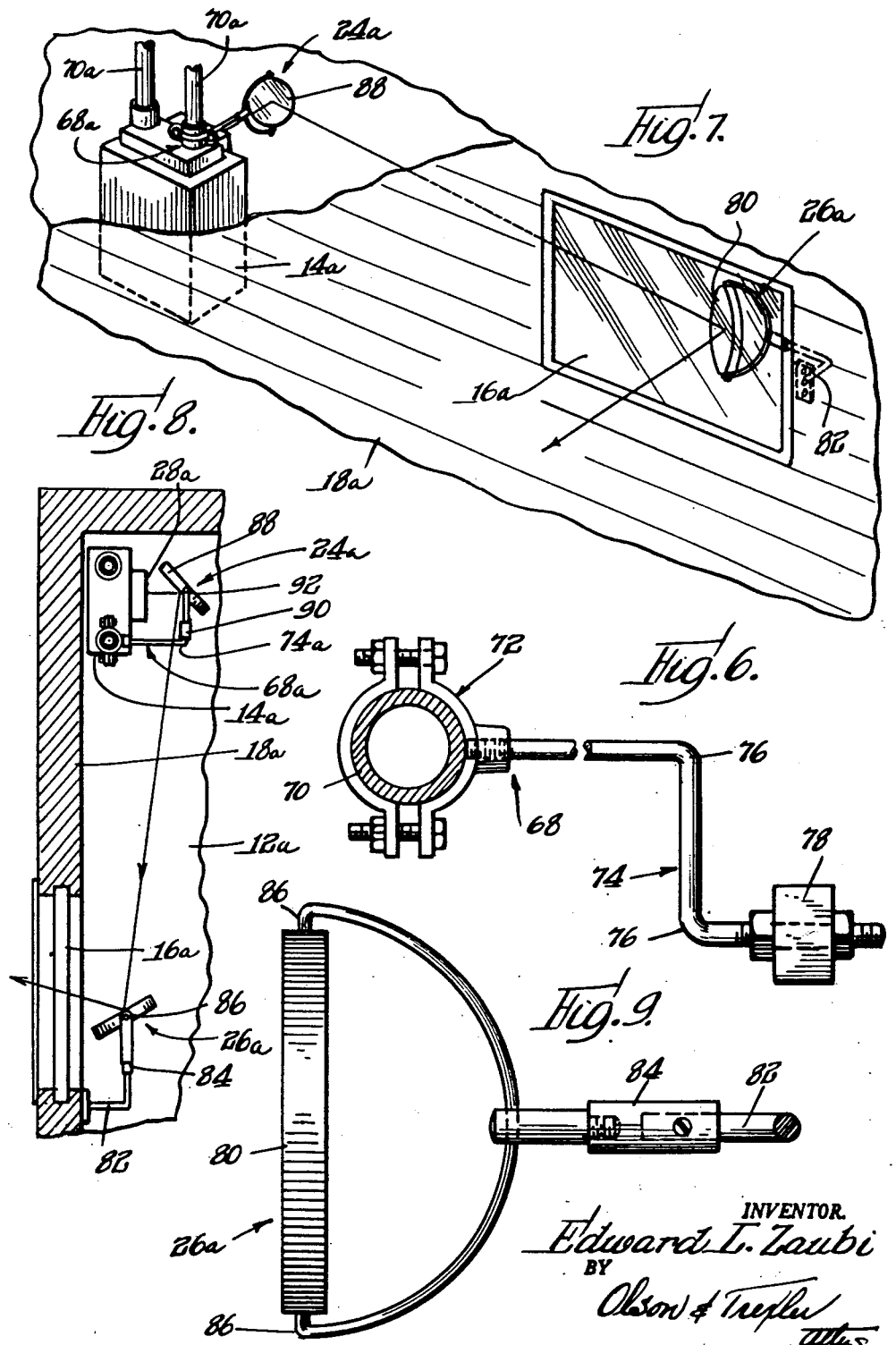

3,071,035
OPTICAL METER READING SYSTEM
Edward L. Zaubi, Springfield, Ill., assignor to Opti-Matic, Inc., Chicago, Ill., a corporation of Illinois
Filed June 12, 1959, Ser. No. 819,990
1 Claim. (Cl. 88—1)

The present invention relates to the reading of utility meters, such as gas and electric meters, which are commonly installed in basements or other rooms of residences and similar buildings which are not freely accessible to the meter reader.

At best, the necessity for admitting a meter reader into a building for reading a meter at regular intervals is a time-consuming nuisance both for the householder and the meter reader. Moreover, as often happens, the meter reader may not be able to gain admission for reading a meter because there is no one on the premises to admit him when he arrives. This necessitates repeated calls by the reader or resort to estimated readings for billing purposes, or both.

Others have recognized the desirability of providing means which would enable the meter reader to read a meter installed inside a room in a building without having to enter the room. This would eliminate the nuisance to the householder and the burden on the utility company involved in the meter reader's being obliged to seek admission to the meter room each time he makes a call. However, means previously devised for this purpose have not been acceptable in practice because the advantages gained have been outweighed by disadvantages inherent in the means provided for this purpose. Such disadvantages have included unduly high manufacturing and installation costs, as well as great inconveniences and problems associated with the installation and accommodation of such meter-reading structures on the premises.

One object of the invention is to provide, for enabling a meter reader to read a utility meter inside a room of a building from a freely accessible viewpoint outside the room, a novel and highly efficient optical meter-reading system comprising two structurally separate optical units which can be manufactured and permanently installed in virtualy any room housing a meter at a cost far below the economic value of the advantages gained by eliminating the necessity for the reader to enter the room to read the meter.

Another object of the invention is to provide for enabling a meter reader, looking into a room through a transparent window or the like, to read a meter in even a remote location in the room out of the direct line of sight of the reader, a novel meter-reading optical system consisting of two structurally separate optical units (an objective unit and a viewing unit) both of which are susceptible of very economical manufacture and well adapted by virtue of the construction of the units to be quickly installed in virtually any room housing a utility meter without obstructing normal use of the room and readily adjusted to have a mutual optical alignment in series between a meter located at substantially any position in the room and a viewpoint outside the room located adjacent the window or the like through which the reader can look into the room.

A further object is to provide a universal, two-unit meter-reading optical system as recited in the above objects which provides a true, rectified, image of the meter to a reader looking into the viewing unit of the system from a viewpoint outside the room which houses both the meter and the optical system. A related object is to provide a universal, two-unit optical meter-reading system, as recited, which enables the reader to read with the unaided eye a meter mounted in a location so remote from the point of view of the reader that it could not be read with the unaided eye even if it were in the direct line of sight of the reader.

Another object is to provide a universal, multiple unit optical meter-reading system, as recited in the preceding objects, which provides to a reader outside the meter room an artificially and effectively lighted view of the meter when the beam of a flashlight or the like is directed directly into the viewing unit of the system.

Other objects and advantages will become more apparent from the following description of the exemplary embodiments of the invention illustrated in the drawings, in which:

FIGURE 1 is a fragmentary perspective view illustrating one embodiment of the invention installed in the room of a building housing a utility meter;

FIG. 2 is a fragmentary plan view of the portion of the room in which the meter and meter-reading optical system are installed;

FIG. 3 is a fragmentary sectional view of the objective unit of the optical system taken along the line 3—3 of FIG. 1;

FIG. 4 is a vertical sectional view of the viewing unit of the optical system taken along the line 4—4 of FIG. 1;

FIG. 5 is a transverse sectional view of the viewing unit taken along the line 5—5 of FIG. 4;

FIG. 6 is a sectional view taken along the plane 6—6 of FIG. 1 and showing mounting structure for the objective unit of the meter-reading system;

FIG. 7 is a perspective view similar to FIG. 1 but showing a modified form of the invention installed in a room housing a utility meter;

FIG. 8 is a fragmentary plan view of the room housing the modified meter-reading system of FIG. 7; and FIG. 9 is an elevational view of the viewing unit of the modified optical system of FIG. 7.

Referring to the drawings in greater detail, FIGS. 1 and 2 illustrate a typical installation of one embodiment of the invention in a room 12 in which a utility meter 14 is installed out of the direct line of sight of a person looking into the room through a window 16 in a wall 18 of the room. Typically, the room 12 will be the basement of a residence and the window 16 will be situated in a place such that a meter reader may look into the room through the window. However, it will be understood that the window 16 is merely illustrative of any optically transparent passageway through which a meter reader can look into the room housing the meter. Such a passageway may be formed by a glass door or merely an unobstructed opening into the room.

The novel optical meter-reading system provided by the invention for enabling a meter reader (who is represented in the drawings by the hand 20 holding the flashlight 22 outside the window 16 in FIG. 1) to read the meter 14, which is located out of the direct line of sight of the meter reader as he looks through the window 16, comprises two structurally separate optical units, an objective unit 24 adjustably but permanently mounted adjacent the meter 14 and a viewing unit 26 adjustably but permanently mounted inside the room 12 adjacent the window.

The objective unit 24 and the viewing unit 26 each includes at least one light redirecting element. As used here the term a "light redirecting element" denotes either a lens or a mirror. The light redirecting elements in both the objective unit 24 and the viewing unit 26 include two mirrors, which as will presently appear complement each other optically to provide a true image rather than a "mirror" image of the indicator dials 28 on the meter 14.

The meter-reading optical system illustrated in FIGS.

1 to 6 is designed for installation in a room in which the indicator dials 28 are located in a direct line of sight from the viewing unit 26 when the latter is mounted adjacent the window 16. For use in situations in which the meter dials 28 are not in the direct line of sight of the viewing unit 26, a modified form of the invention illustrated in FIGS. 7 to 9 is employed. This alternative form of the invention will be described later.

In the system designed for mounting in a room in which the meter dials 28 are in the direct line of sight of the viewing unit 26, the viewing unit itself comprises two mirrors 30, 32 mounted together in a common housing 34 which provides for adjustment of the mirrors with respect to each other to obtain the desired optical alinement of the mirrors with the meter and the reader's point of view outside the building, while at the same time providing and assuring a mutual optical alinement of the mirrors with respect to each other for all positions of relative adjustment of the mirrors.

In the preferred form shown, the housing 34 which provides a common adjustable support for the two mirrors 30 and 32 has a generally cylindrical shape overall and is formed of plastic in two half-sections 36, 38 which are substantially identical but inverted relative to each other.

Each of the housing sections 36, 38 has a generally circular, cup-like shape adapted to form one end of the cylindrical housing 34. Two peripheral flanges 40 on adjacent ends of the two sections 36, 38 are circled and clamped together by a common clamping band 44.

Two opposed ears 46 on adjacent ends of the band 44 are connected to an adjustable mount 48 for the housing 34 by an adjustable clamping screw 50 extending through both ears as shown.

The mirrors 30 and 32 are mounted in the respective housing sections 36, 38 in positions which are inclined at angles of approximately 45 degrees relative to the longitudinal axis 52 of the housing, FIG. 4. As shown, the mirrors are supported by suitable plastic brackets and lugs 54 on the plastic housing sections.

Light enters and leaves the housing 34 through two openings 56, 58, FIGS. 4 and 5, formed in the side walls of the respective housing sections 36 and 38 in alinement with the reflecting faces of the respective mirrors 30 and 32, which are inclined toward the center of the housing. The previously described mounting of the mirrors 30, 32 in the housing 34 provides a mutual optical alinement of the mirrors by which light entering the housing through either of the openings 56, 58 is reflected by the adjacent mirror onto the other mirror, which reflects the light out the other housing opening.

Moreover, the housing sections 36, 38, as held together by the band 44, maintain the mutual optical alinement of the mirrors 30, 32 while providing for independent rotary adjustment of the individual sections and mirrors through any desired angle around the housing axis 52, upon loosening of the band 44.

The previously mentioned adjustable support structure 48 for the viewing unit housing 34 comprises, as shown in FIG. 2, a bracket 60 adapted to be mounted on the structure of the building adjacent the window 16. The bracket 60 provides support for two adjustable swivel supports 62, 64 incorporated into the support structure 48 and providing for adjustment of the housing 34 about two mutually perpendicular axes both of which are perpendicular to the axis 52 of the housing.

The viewing unit 26, constructed and supported in the manner described, is capable of reflecting to a meter reader standing outside of the window 16 an image of meter dials 28 located in any position within the room 12 which is within a direct line of sight from the viewing unit.

The matter of installing the viewing unit 26 is very simple. The adjustable support 48 is fixed to wall structure, floor support sills, or any other suitable support structure adjacent the window 16. Optical alinement of the mirrors 30 and 32 with each other is assured by the mounting of the mirrors in the common housing 34. Simple rotary adjustments of the two supporting housing sections 36 and 38 around the housing axis 52 effects optical alinement horizontally of the mirrors 30, 32 with the meter 14 and with the external viewpoint outside the window 16. Adjustment of one or both of the swivel supports 62 and 64 provides an optical alinement vertically of the mirrors with the meter 14 and window 16. Moreover, various combinations of these adjustments can be used to effect the desired optical alinement of the viewing unit 26 with both the meter 14 and the external point of view.

The objective optical unit 24 used with the viewing unit 26 as described is designed to provide an enlarged image of the meter dials 28 which enables the meter reader to read the meter through the viewing unit 26 with the unaided eye even though the distance of the meter 14 from the window 16 exceeds the distance at which the meter dials 28 could be read with the unaided eye.

Thus, as shown, the objective optical unit 24 comprises a magnifying lens 66, FIGS. 1 and 3, supported by adjustable bracket structure 68, FIGS. 1 and 6, in a position between the meter dials 28 and the viewing unit 26 at a location having a spacing from the meter dials 28 which provides an optimum magnification of the image of the dials picked up by the viewing unit 26.

The magnifying lens 66 is a simple, inexpensive lens which can be formed from an inexpensive plastic material.

A typical utility meter, as represented by the meter 14, records the consumption of the quantity of electricity, gas, water or the like which is transmitted through the meter through conduits or conduit-like elements 70. Advantage is taken of this in providing support structure 68 for the objective unit 24 which is extremely simple in construction yet substantially universally usable in this environment.

Thus, as shown in FIGS. 1 and 6, the support structure 68 comprises an adjustable bracket or collar 72 adapted to clamp around a conduit 70 connected into the meter 14. A support rod 74 cantilevering from the collar 72 can be turned in any direction around the supporting conduit 70 by adjustment of the collar 72. The projecting end of the rod 74 is offset a substantial distance laterally from the supported end of the rod by a pair of right angle bends 76 formed in the rod and spaced from each other as shown in FIG. 6. An adjustable mount 78 on the projecting end of the cantilever 74 supports the lens 66, as shown in FIG. 3, and provides for adjustment of the lens along the cantilever. The mount 78 also includes a swivel adjustment for adjusting the lens 66 rotatably with respect to the cantilever 74.

The adjustability of the lens 66 rotatably with respect to the cantilever 74 and along the cantilever together with the adjustability of the collar 72 on a conduit element 70 and the rotary adjustment of the offset cantilever 74 with respect to its support collar, provide mounting means which is substantially universally usable in this environment for supporting the lens 66 in an optimum viewing position relative to the indicator dials 28 of meters of a wide variety of styles and types.

A meter reader looking through the window 16 into the viewing unit 26 sees a clearly readable, true image 80, FIG. 1, of the meter dials 28. As previously mentioned, this image is rectified and made true by the reflection of the image by two mirrors in series.

In the event that the meter 14 is not lighted sufficiently for the reader to see a clear image of the dials 28, he has merely to direct the beam of a flashlight 22 onto the same mirror 32 in which he views the meter image, as shown in FIG. 1. The beam of light is transmitted by the pre-alined optical system to illuminate the meter dials, an image which is transmitted back through the optical system to the reader.

In situations in which the dials of a meter installed in a room are not in a direct line of sight from an optical viewing unit located just inside a window or similar optical opening into the room, an alternative embodiment of the invention, illustrated in FIGS. 7 to 9, is used. Components of this embodiment which are similar to those of the embodiment just described are identified by the same reference numerals with the addition of the suffix "a."

In this embodiment one mirror is used in each of the optical units 24a and 26a. Thus, the unit 26a comprises a plain mirror 80 supported in spaced relation to the window 16a inside the room 12a by means of a mounting bracket 82 adapted to be attached to adjacent building structure. The bracket 82 supports the mirror 80 through two adjustable swivels 84, 86, FIGS. 8 and 9, which provide for adjustment of the mirror rotatably about two axes perpendicular to each other. This viewing unit can be quickly installed and readily adjusted to reflect light from any point inside the room to a new viewpoint just outside the window 16a.

The objective unit 24a comprises a magnifying mirror 88 supported by bracket structure 68a on a conduit element 70a connected into the meter 14a. The support structure 68a is similar to the support structure 68 for the objective unit of the previously described embodiment of the invention, except that the cantilever rod 74a is shaped to have only a single right-angle bend as shown in FIG. 8. The mirror 88 is supported on the cantilever arm 74a by a pair of swivel supports 90, 92, FIG. 8, which provide for adjustment of the mirror 88 about two mutually perpendicular axes.

The objective mirror 88 is located in a direct line of sight from the viewing mirror 80 in a position to reflect light to the viewing mirror 80 from the meter dials 28a, which are not in a direct line of sight from the viewing mirror 80. The objective mirror 88 is properly spaced from the meter 14a to make optimum use of the magnifying properties of the mirror 88 to facilitate reading of the meter with the unaided eye even though it may be in a remote position with respect to the window 16a. The reflection of light through the two mirrors 88, 80 which are in optical alinement with each other and with both the meter dials 28a and the external viewpoint of the reader provides a rectified true image of the meter dials to the reader outside the room.

The two optical units of each embodiment of the invention are inherently well suited for extremely economical manufacture and can be readily installed in virtually any room containing a meter and having an outside window or other optical opening through which a reader can see into the room. Moreover, the struturally separate units of the meter-reading system as installed are located in out-of-the-way positions and do not interfere with normal use of the room housing the meter.

While worthwhile advantages are realized from the use of the particular embodiments of the invention illustrated and described, it will be understood that the invention includes variants and alternative constructions within the scope of the invention as defined by the claim.

I claim:

In a building construction comprising means defining an enclosed room having an outside wall with window means therein, a utility meter supported from said building construction within said room, said utility meter having indicia thereon for reading the quantity of utility product delivered, comprising a rod, means adjustably supporting said rod from said meter with said rod projecting beyond said indicia, a magnifying lens, means adjustably supporting said magnifying lens on said rod and forward of said indicia, said adjustable support means including means for moving said lens along said rod toward and away from said indicia, a periscope device, and means supporting said periscope device from said building construction adjacent said window means and visible through said window means, said periscope device comprising upper and lower portions relatively rotatable about a longitudinal axis, said upper portion having a mirror therein arranged at an acute angle to and lying across said longitudinal axis and at right angles to a plane containing said longitudinal axis and a line extending between said lens and said longitudinal axis, said lower portion of said periscope device having a mirror therein arranged at an acute angle relative to said longitudinal axis, the mirror in the upper portion being tilted down, and the mirror in the lower portion being tilted up, the mirror in the lower portion facing toward said window means whereby an enlarged, upright image of the indicia may be observed in the mirror in the lower portion through said window means.

References Cited in the file of this patent
UNITED STATES PATENTS

| | | |
|---|---|---|
| 388,934 | Trapp | Sept. 4, 1888 |
| 757,900 | England | Apr. 19, 1904 |
| 1,013,542 | Ford | Jan. 2, 1912 |
| 1,617,932 | Work et al. | Feb. 15, 1927 |
| 1,828,924 | Cardell et al. | Oct. 27, 1931 |
| 2,043,053 | Martin | June 2, 1936 |
| 2,181,453 | Gelakoski | Nov. 28, 1939 |
| 2,426,207 | Handy | Aug. 26, 1947 |